(12) United States Patent
Snow

(10) Patent No.: US 6,863,462 B1
(45) Date of Patent: Mar. 8, 2005

(54) APPARATUS FOR OPTIMIZING THE STIFFNESS OF AN AXLE

(75) Inventor: Robert E. Snow, San Jose, CA (US)

(73) Assignee: Snow Family Trust, San Jose, CA (US)

( * ) Notice: Subject to any disclaimer, the term of this patent is extended or adjusted under 35 U.S.C. 154(b) by 0 days.

(21) Appl. No.: 10/460,881

(22) Filed: Jun. 13, 2003

(51) Int. Cl.[7] .................................................. F16B 9/00
(52) U.S. Cl. ........................ 403/290; 403/310; 403/312
(58) Field of Search ................................ 403/290, 310, 403/312, 313; 285/419, 398, 373

(56) References Cited

U.S. PATENT DOCUMENTS

| | | | | |
|---|---|---|---|---|
| 4,706,380 A | * | 11/1987 | Fall | .......................... 285/419 X |
| 5,348,210 A | * | 9/1994 | Linzell | .................... 403/369 X |
| 5,358,286 A | * | 10/1994 | Eaton et al. | ................. 285/197 |
| 5,374,085 A | * | 12/1994 | Beatrice et al. | ......... 285/419 X |
| 6,561,723 B2 | * | 5/2003 | McCurdy et al. | ........... 403/312 |

* cited by examiner

Primary Examiner—John R. Cottingham
(74) Attorney, Agent, or Firm—IP Strategy Group PC (57) ABSTRACT

An apparatus including a stiffening structure for stiffening a portion of an axle with a first diameter. The apparatus further includes a set of elements, wherein each of the set of elements includes a semi-circular longitudinal channel of a pre-determined length, and further includes a second diameter that is substantially similar to the first diameter. The apparatus also includes an outer surface comprising a set of expanded structures, wherein each expanded structure of the set of expanded structures further includes a set recesses, wherein each of the elements can be coupled together around the axle with the set of expanded structures, and wherein the amount of deflection of the axle is substantially reduced for the pre-determined length.

19 Claims, 7 Drawing Sheets

APPARATUS FOR OPTIMIZING THE STIFFNESS OF AN AXLE

FIELD

The present invention relates in general to motorized land vehicles, and in particular to apparatus for optimizing the stiffness of an axle.

BACKGROUND OF THE INVENTION

Stability and traction are important to the operation of motorized land vehicles. Without either, a vehicle may spinout or tip over, causing damage and injury. Stability allows the vehicle to resist inertia during a change in the magnitude or direction of motion. While traction allows the vehicle to grip the surface upon which it moves.

Stability is commonly controlled by the driving skill of the vehicle driver and by proper vehicle weight distribution, or more specifically, by the position of the vehicle's center of gravity (CG) relative to the ground. CG is a virtual point through which inertial forces appear to act on the vehicle. Adjusting the CG closer to the ground tends to improve the vehicle's traction, and helps reduce the required driver skill. Many modern vehicles are designed with a differential in order to maintain stability while maneuvering. However, other vehicles may not use a differential for reasons of cost and complexity.

A differential is a structure usually coupled to an axle and allows the wheels to rotate at different rates. Without a differential, wheels attached to a single axle must rotate together at the same speed. This presents a problem in a turn, since the inside wheel (traveling on a smaller arc) tends to turn a lot slower than the outside wheel (traveling on a larger arc). In order to effectively complete the turn, the inside wheel would either need to skid over the road surface, or must lift while turning.

Go-carts, for example, typically lack a differential. The typical racing go-cart is a relatively simple motorized vehicle large enough to accommodate only one individual, consisting of a tubular frame with a generally single-cylinder engine. A go-cart frame is usually formed from segments of steel tubing rigidly welded together, and the rear axle is connected to this frame by means of rigid bearing hangers. Each of the front wheels are coupled to individual stub axles that independently rotate around some type of pin, which is further coupled to the steering mechanism.

While turning, centripetal force causes a weight shift away from the center of the turn. It is this weight shift that helps cause the inside rear wheel to lift. If the inside wheel does not sufficiently lift of the road surface, it causes the rear axle to lock and make the vehicle sluggish. If the inside wheel lifts too much, the go-cart may change direction too rapidly, subsequently causing the vehicle to spin or slide. The amount of traction, and hence overall performance of the vehicle can be modified by altering the stiffness of the axle, and hence its tendency to lift while maneuvering. Stiffness refers to the rigidity of the axle. That is, the amount of deflection for the axle produced by a given force. In general, deflection depends on the length of the axle, its cross-sectional shape, the material, where the deflecting force is applied, and how the axle is supported. In a turn, the degree of axle deflection for any point along the longitudinal axis tends to increase toward the inside wheel. However, structures coupled along the axle, such as the wheel hubs, tend to decrease the deflection, since they act to support the axle.

A common way to modify axle stiffness is to replace the entire axle. In general, the stiffer the axle, the greater the wall thickness. Go-cart manufacturers typically make axles of a soft, medium and hard stiffness. The use of medium stiffness is most common. The hard axle is used when the weather is cold, in slippery track conditions, or when rules mandate the use of harder compound tires. The soft axle is used if conditions are extremely "grippy", or where there is excess rubber build up.

Replacing axles can be time consuming and problematic. Originally a recreational pass time, go-cart racing has become an almost semi-professional sport with organized teams and expensive stylized go-carts. A competitive race normally comprises a set of laps, wherein wining is often determined by a fraction of a second. Removing an axle often requires the detachment of the rear wheel hubs, a brake disk, and a drive sprocket. These components that are often difficult to quickly remove in a safe manner, without the use of multiple tools. In practice, since axle replacement often takes over 10 minutes, it is usually done only between races. However, racing conditions can often change during the race. For instance, a decrease in temperature or a rain shower can reduce the tackiness of the tires, causing a reduction in tire traction.

Figure 1:
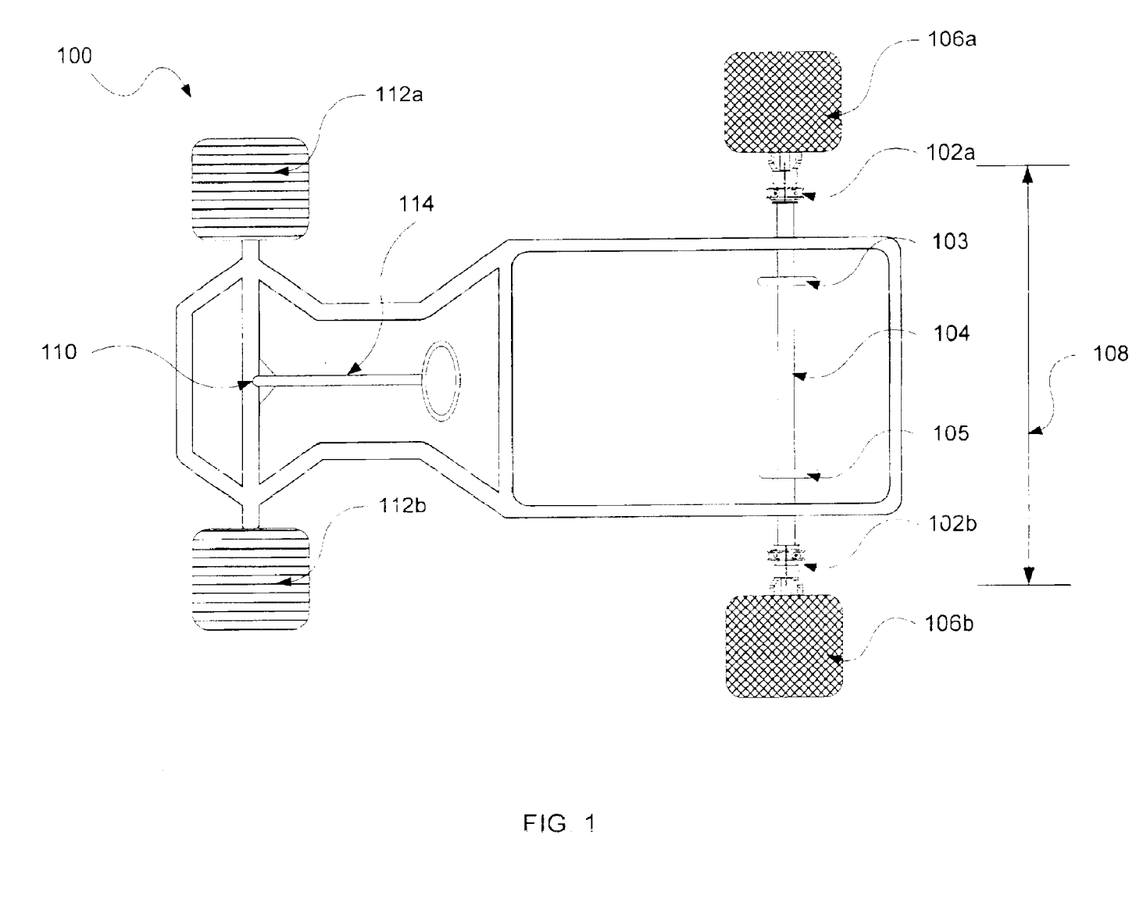
FIG. 1 illustrates a simplified diagram of a go-cart chassis.

FIG. 1 illustrates a simplified diagram of a go-cart chassis 100. Front axle 110, is normally comprised of a fixed width wheelbase, and provides a steering mechanism for the vehicle. That is, wheels 112*a–b* rotate left or right in response to corresponding movements in steering column 114. Rear axle 104 is often connected to an engine, through a drive chain or belt through drive sprocket 105. Rear wheels 106*a–b* are commonly attached to rear axle 104 through some type of clamp assembly 102*a–b*. In a common method, clamp assembly 102 securely clamps the wheel hub of wheel 106 to a position along axle 104. Rear axle 104 further comprises a brake disk 103, coupled to the braking system, and a drive sprocket 105. Replacing rear axle 104 first requires the driver to stop the engine and exit the go-cart. Removing clamp assembly 102*a–b*, brake disk 103, and drive sprocket 105. Sliding out the old axle. Replacing the new axle. And finally, reattaching clamp assembly 102*a–b*, brake disk 103, and drive sprocket 105. The driver can then re-enter the go-cart and re-start the engine.

Figure 2:
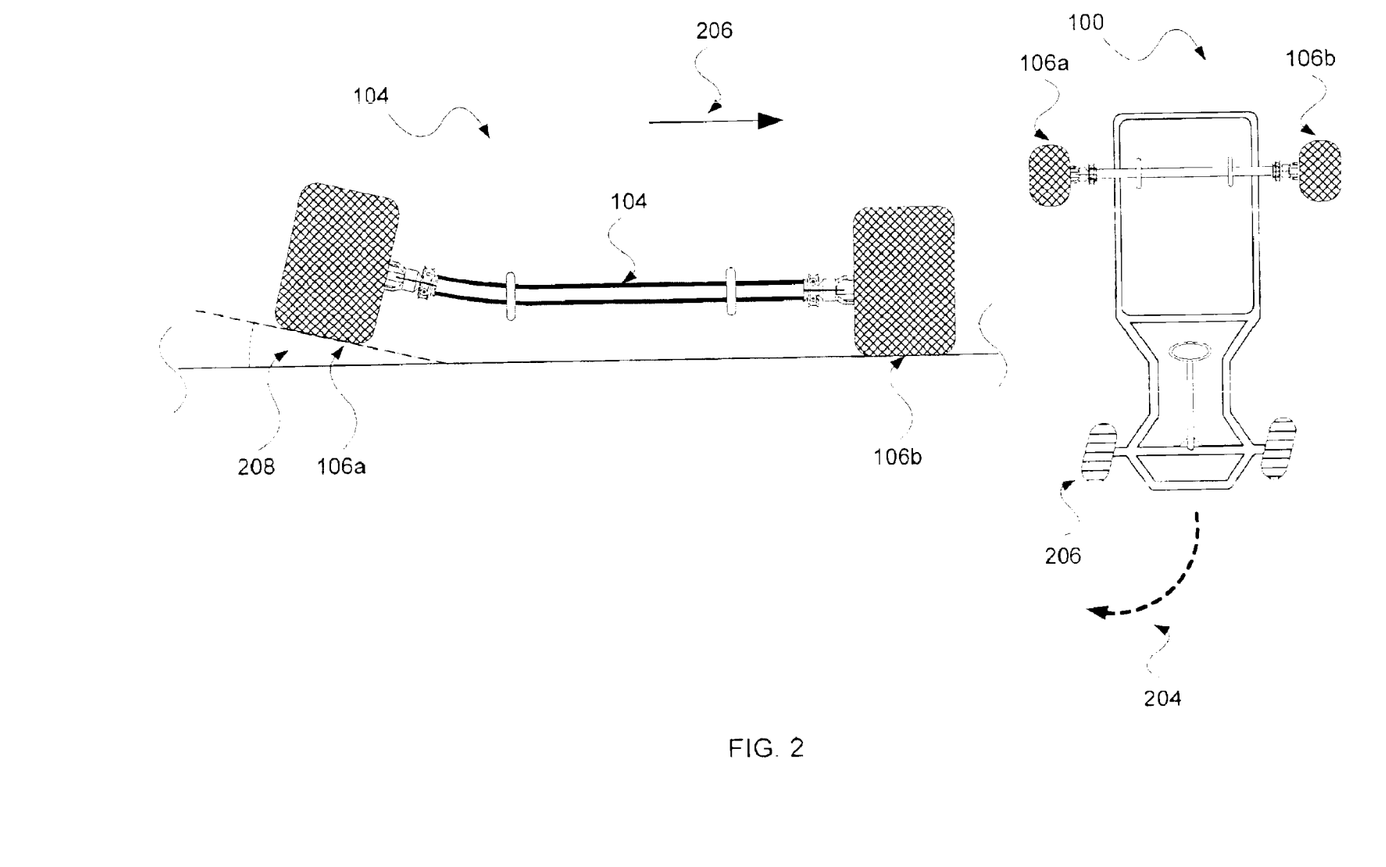
FIG. 2 illustrates a simplified diagram of a go-cart chassis as shown in FIG. 1 during a turn.

Referring to FIG. 2, a simplified diagram of the go-cart chassis 100 of FIG. 1 during a turn is shown. In this example, the go-cart is turning clockwise 204 (or to the right from the driver's perspective). As the go-cart turns, the vehicles inertia 206 imposes a centripetal force. This causes a weight shift away from the center of the turn, lifting the inside rear wheel 106*a* of rear axle 104 by a clearance 208. It is clearance 208 that helps prevent the rear axle from locking, reducing the vehicles performance. Reducing the stiffness of rear axle 104 can increase clearance 208 in a turn, whereas increasing the stiffness can reduce clearance 208.

Figure 3A:
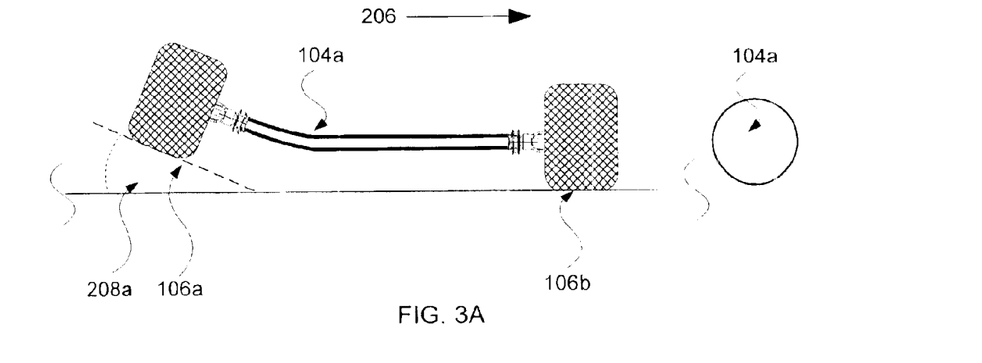
FIGS. 3A–C illustrates a simplified diagram of a go-cart chassis as shown in FIG. 1 during a turn with varying degrees of rear axle stiffness.
Figure 3B:
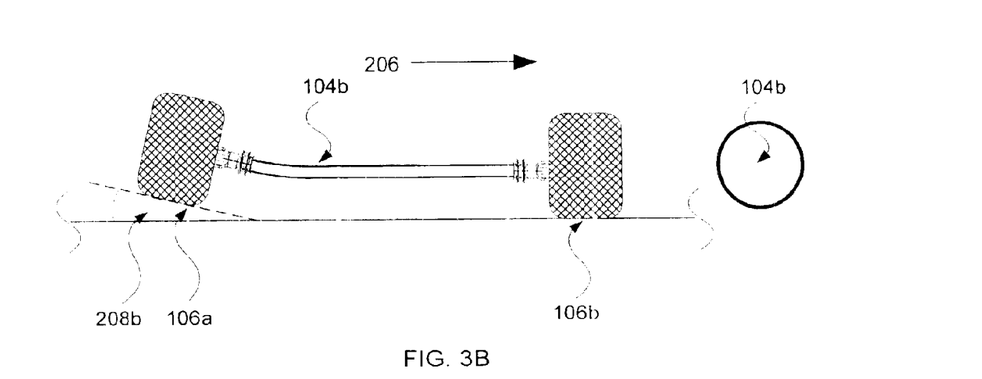
Figure 3C:
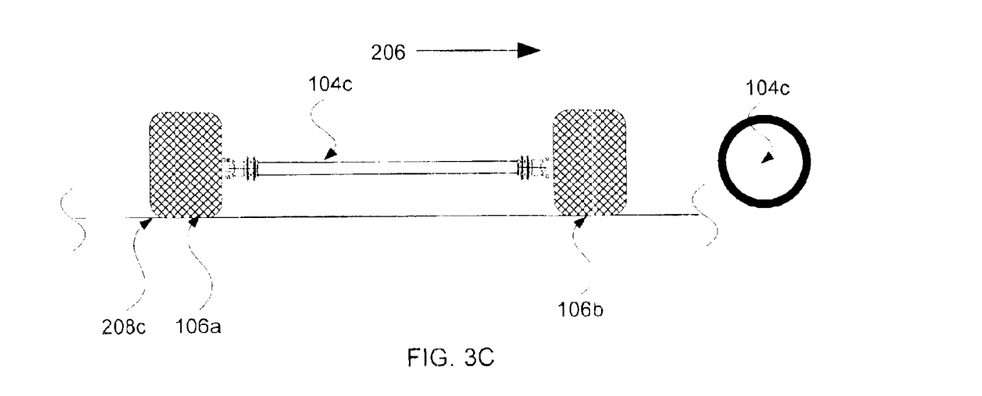

Referring to FIGS. 3A–C, simplified diagrams of rear axle 100 of FIG. 1 during a turn are shown with varying degrees of rear axle stiffness. In these examples, the go-cart turns clockwise (or to the right from the vehicle driver's perspective), the vehicles inertia 206 imposes a centripetal force. This causes a weight shift away from the center of the turn. In FIG. 3A, a soft rear axle 104*a* is shown lifting the inside rear wheel 106*a* of by a clearance 208*a*. In FIG. 3B, a medium rear axle 104*b* is shown with the same inertial force 206, lifting the inside rear wheel 106*a* by a smaller clearance 208*b*. In FIG. 3C, a hard rear axle 104*c* is shown with the same inertial force 206, lifting the inside rear wheel 106*a* by a still smaller clearance 208*c*.

An alternative solution to replacing the rear axle is increasing the effective wall thickness by the use of an inner stiffening cylinder. This structure can be inserted into the open longitudinal cavity of the rear axle. In a common method, the inner stiffening cylinder can be inserted into the rear axle during a race while the engine is running and the driver is still on the vehicle. The inner stiffening cylinder, is usually about the same length as the rear axle, and is first inserted than then expanded to firmly contact the rear axle's inner surface, creating a friction lock. However, this method can also be problematic. Since the rear axle does not normally have end caps, the inner cylinder can vibrate lose during a race, and slide (or in some cases fly) out of the rear axle, potentially causing injury and damage.

Figure 4A:
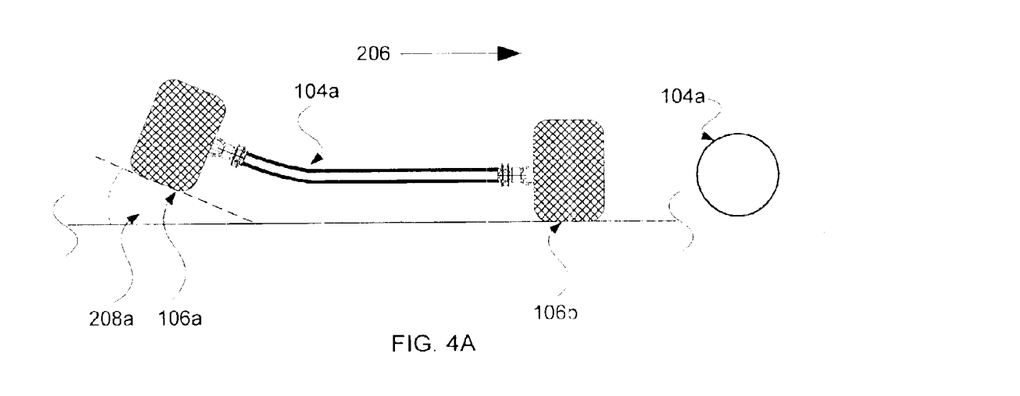
FIGS. 4A–C illustrates a simplified diagram of a go-cart chassis as shown in FIG. 1 during a turn with an inner stiffening cylinder.
Figure 4B:
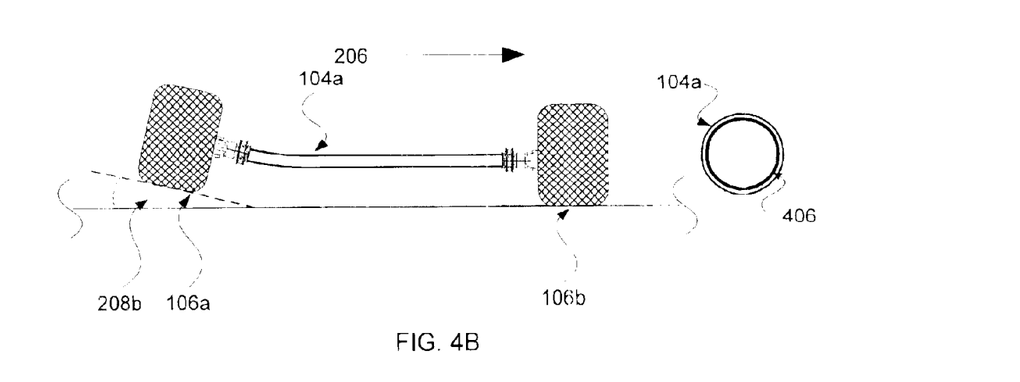
Figure 4C:
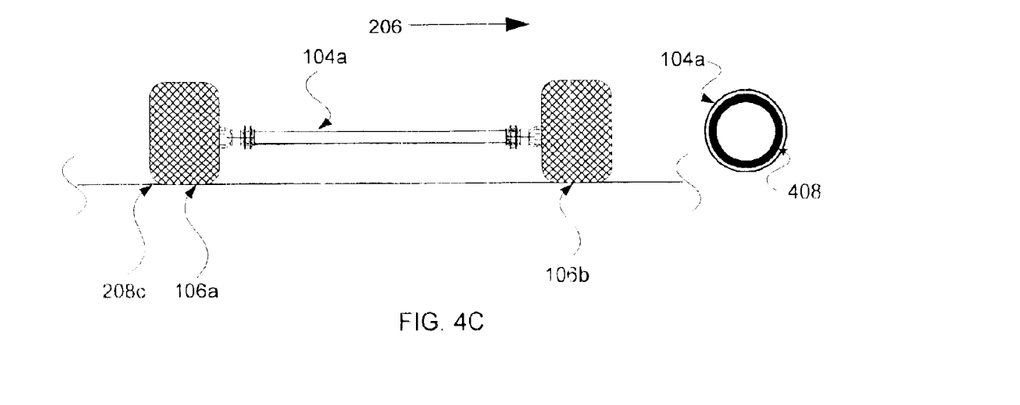

Referring to FIGS. 4A–C, simplified diagrams of rear axle 100 of FIG. 1 during a turn are shown with an inner stiffening cylinder. As in FIGS. 3A–C, the go-cart turns clockwise (or to the right from the vehicle driver's perspective), the vehicles inertia 206 imposes a centripetal force. This causes a weight shift away from the center of the turn. In FIG. 4A, soft rear axle 104a of FIG. 3A is shown lifting the inside rear wheel 106a of by a clearance 208a. In FIG. 4B, soft rear axle 104a comprises an inner stiffening cylinder 406 further creating an effective stiffness substantially equivalent to medium rear axle 104b of FIG. 3B. In this configuration, the same inertial force 206 lifts the inside rear wheel 106a by a smaller clearance 208b. In FIG. 4C, soft rear axle 104a comprises an inner stiffening cylinder 408, with a wall thickness greater than that in FIG. 4B, and further creating an effective stiffness substantially equivalent to hard rear axle 104c of FIG. 3C. In this configuration, the same inertial force 206 lifts the inside rear wheel 106a by a still smaller clearance 208c.

In the discussions that follow, the term "tighten" is employed herein to discuss moving a fastener into a securing structure. Likewise, the term "loosen" is employed herein to discuss moving a fastener out of a securing structure. The term screw should be understood to apply to other types of fasteners, such as bolts, clips, and pins. Furthermore, the terms "soft," "medium," and "hard" refer to relative and not absolute degrees of stiffness. That is, "medium" is stiffer than "soft," and "hard" is stiffer than both "soft" and "medium." A structure may be presumed to be "hard" in comparison to other structures in one context, yet may be determined as a "soft" structure in another context.

In view of the foregoing, there is desired an apparatus for optimizing the stiffness of an axle.

SUMMARY OF THE INVENTION

These and other features of the present invention will be described in more detail below in the detailed description of the invention and in conjunction with the following figures.

The invention relates, in one embodiment, to an apparatus including a stiffening structure for stiffening a portion of an axle with a first diameter. The apparatus further includes a set of elements, wherein each of the set of elements includes a semi-circular longitudinal channel of a pre-determined length, and further includes a second diameter that is substantially similar to the first diameter. The apparatus also includes an outer surface comprising a set of expanded structures, wherein each expanded structure of the set of expanded structures further includes a set recesses, wherein each of the elements can be coupled together around the axle with the set of expanded structures, and wherein the amount of deflection of the axle is substantially reduced for the pre-determined length.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

In accordance with one aspect of the invention, a stiffening structure is advantageously employed in order to increase axle stiffness. As previously described, the amount of axle deflection during a turn at any point along the longitudinal axis tends to increase toward the inside wheel. In a non-obvious manner, the stiffening structure can be coupled to the axle, to further control the effective amount of axle deflection. That is, the stiffening structure can effectively modify the axle's cross-sectional shape, increasing the axle's effective wall diameter, and subsequently its stiffness. In general, a stiffening structure with a longer longitudinal length tends to increase stiffness more than a shorter stiffening structure.

Unlike current methods and apparatus of optimizing axle stiffness, the present invention allows the stiffness to be quickly modified during a race, without first requiring the driver to exit the vehicle or stop the engine. Furthermore, unlike the use of an inner stiffening cylinder that can vibrate lose and slide out of the rear axle, the present invention is coupled to the axle using a set of fasteners on the axle.

In one embodiment, the stiffening structure is a sleeve that is slidably fitted on the outer peripheral surface of an axle. In another embodiment, the sleeve is a cylinder. In yet another embodiment, the sleeve is comprised of a set of substantially semi-circular halves that can be attached to the axle by a set of fasteners. In yet another embodiment, the sleeve is comprised of two substantially semi-circular halves that are coupled to each other along a longitudinal hinge mechanism, and further attached to the axle by a set of fasteners. In yet another embodiment, the fasteners are locking claws. In yet another embodiment, the stiffening structure is comprised of aluminum.

Figure 5A:
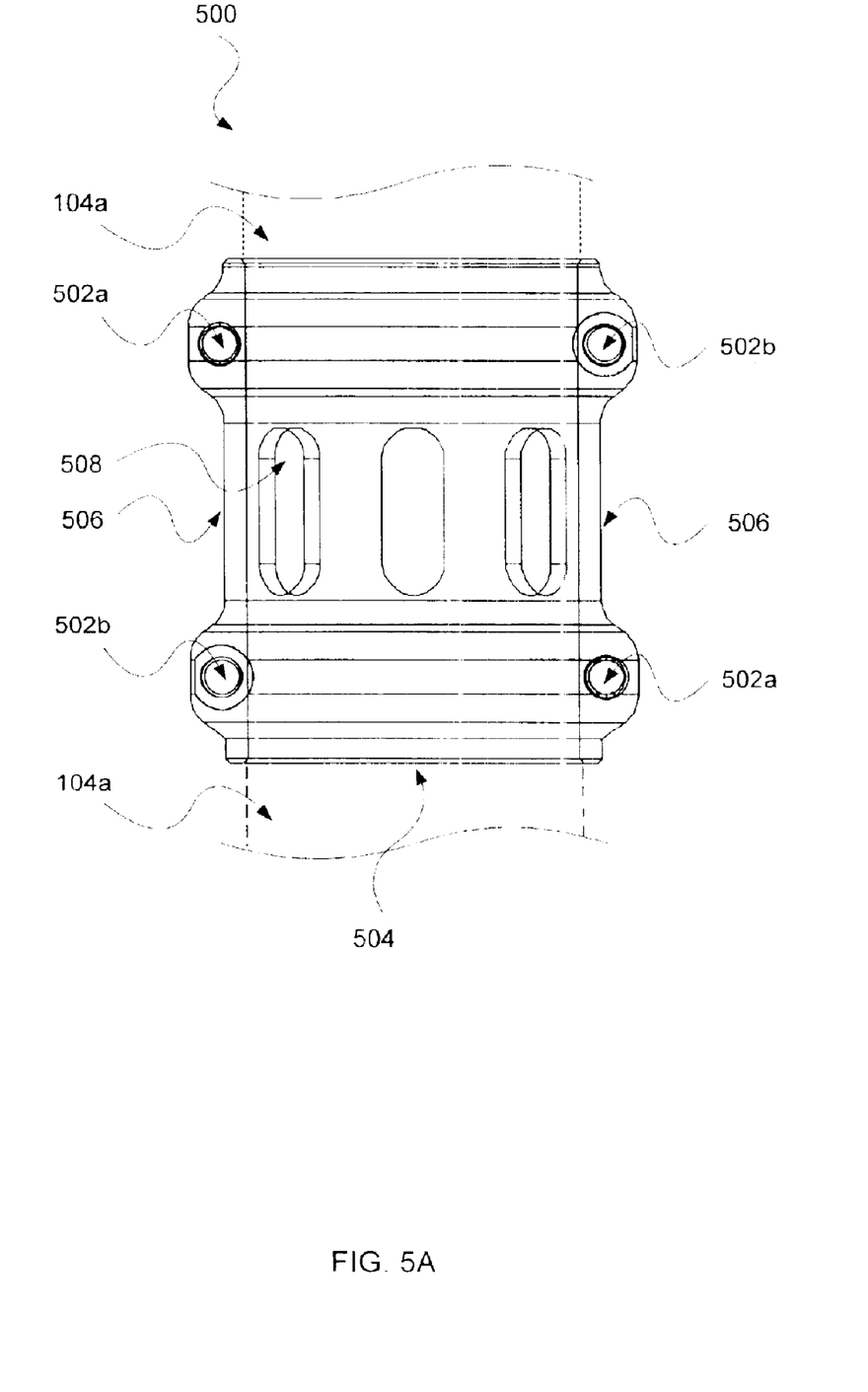
FIGS. 5A–B illustrate, in accordance with one embodiment of the present invention, a simplified diagram of a stiffening structure; and, FIGS. 6A–C illustrate, in accordance with one embodiment of the present invention, a simplified diagram of a go-cart chassis during a turn with a stiffening structure.

Referring now to FIG. 5A, a simplified stiffening structure 500 is shown according to one embodiment of the invention. Stiffening structure 500 is coupled to axle 104a as shown in FIG. 3A along longitudinal cavity 504. Stiffening structure 500 further comprises a cylindrical shape divided into to substantially symmetrical halves along seam 506. In this example, only one half of stiffening structure 500 is displayed. Stiffening structure 500 further comprises of a set of fasteners 502, which are further positioned in a set of recesses that are substantially perpendicular to axle 104a. In this figure, fasteners 502a are positioned in a substantially reversed position to fasteners 502b. For example, if fasteners 502 comprise bolts, the head of bolts 502a would be positioned on a first half of stiffening structure 500, whereas the head of bolts 502b would be positioned on a second half of stiffening structure 500. Stiffening structure 500 also comprises cutouts 508 that allow material to be removed from the stiffening structure, while still maintaining rigidity.

Figure 5B:
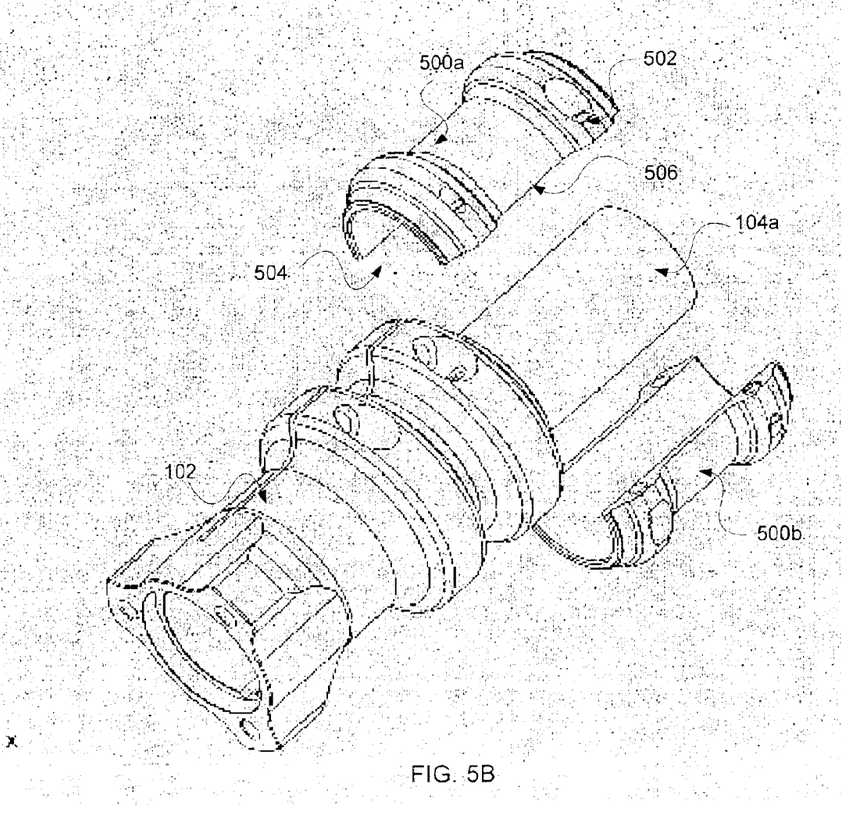

Referring now to FIG. 5B, a simplified stiffening structure is shown positioned with a wheel hub, according to one embodiment of the invention. As in FIG. 5A, stiffening structure 500 is coupled to axle 104a as shown in FIG. 3A along longitudinal cavity 504. Wheel hub 102, as shown in FIG. 1 is also attached to axle 104a. Stiffening structure 500 further comprises a cylindrical shape divided into substantially symmetrical halves 506a–b, along seam 506. Stiffening structure 500 further comprises of a set of fasteners 502, which are further positioned in a set of recesses that are substantially perpendicular to axle 104a.

Figure 6A:
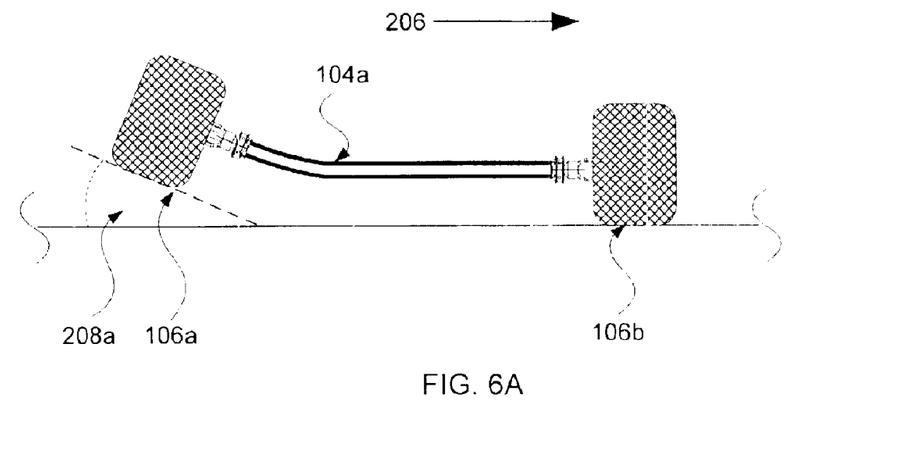
Figure 6B:
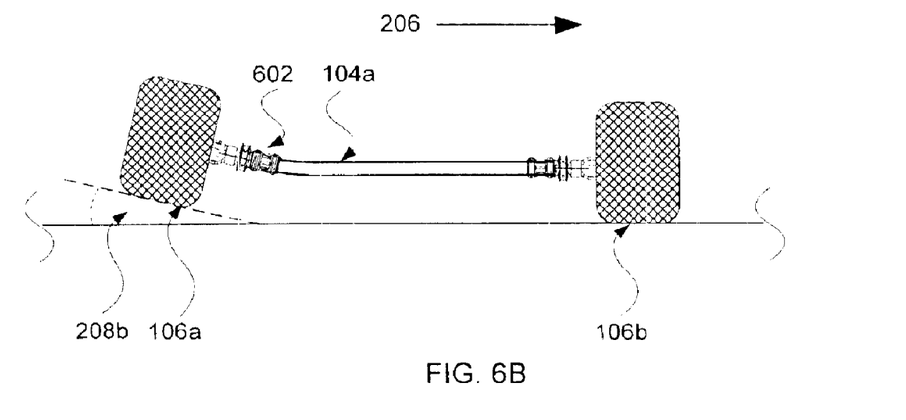
Figure 6C:
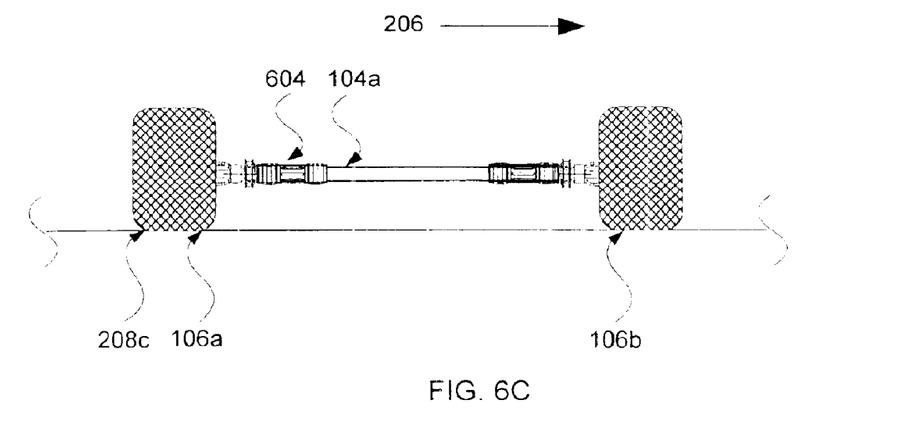

Referring to FIGS. 6A–C, simplified diagrams of rear axle 104a of FIG. 3A are shown during a turn are shown, according to one embodiment of the invention. As in FIGS. 3A–C, in these examples, the go-cart turns clockwise (or to the right from the vehicle driver's perspective), the vehicles inertia 206 imposes a centripetal force. This causes a weight shift away from the center of the turn. In FIG. 6A, soft rear axle 104a of FIG. 3A is shown lifting the inside rear wheel 106a of by a clearance 208a. In FIG. 6B, soft rear axle 104a comprises a stiffening structure 602 further creating an effective stiffness substantially equivalent to medium rear axle 104b of FIG. 3B. In this configuration, the same inertial force 206 lifts the inside rear wheel 106a by a smaller clearance 208b. In FIG. 6C, soft rear axle 104a comprises a stiffening structure 604 further creating an effective stiffness substantially equivalent to hard rear axle 104c of FIG. 3C. In this configuration, the same inertial force 206 lifts the inside rear wheel 106a by a still smaller clearance 208c.

While this invention has been described in terms of several preferred embodiments, there are alterations, permutations, and equivalents which fall within the scope of this invention. For example, although the drawings are described in the context of a go-cart, it should be understood that the invention also applies to other hub and axle structures, as well as to non-tubular clamping assemblies. Furthermore, the term fastener is used in its generic sense, and can be understood to comprise structures such as screws, bolts, clips, and pins. It should also be noted that there are many alternative ways of implementing the apparatuses of the present invention. It is therefore intended that the following appended claims be interpreted as including all such alterations, permutations, and equivalents as fall within the true spirit and scope of the present invention.

Advantages of the invention include the ability to quickly optimize axle stiffness without first requiring the driver to exit the vehicle or stop the engine. Other advantages include coupling the stiffening structure to an axle in order to substantially reduce the likelihood that it vibrates lose.

Having disclosed exemplary embodiments and the best mode, modifications and variations may be made to the disclosed embodiments while remaining within the subject and spirit of the invention as defined by the following claims.

What is claimed is:

1. An apparatus including a stiffening structure stiffening a portion of a vehicle axle for reducing deflection of said axle, wherein said axle is continuous in said apparatus comprising:

a first set of elements adapted to couple to said axle, wherein each of said elements includes a semi-circular longitudinal channel of a first pre-determined length, and said first set of elements are configured to create a substantially cylindrical cavity along said first pre-determined length;

wherein each element includes a set of expanded structures, located generally near the ends of each element, each expanded structure having a recess configured to accept a fastener to facilitate clamping said elements around said axle;

wherein each element includes a non-expanded structure located generally between said set of expanded structures; and wherein a first amount of deflection of said axle is substantially reduced for said first pre-determined length.

2. The apparatus of claim 1, further comprising a fastener disposed in said recesses and configured to clamp the elements around the axle.

3. The apparatus of claim 1, wherein said set of elements is configured to create a substantially consistent cylindrical cavity along said first pre-determined length.

4. The apparatus of claim 2, wherein said set of elements is configured to create a substantially consistent cylindrical cavity along said first pre-determined length.

5. The apparatus of claim 2, wherein said fastener is a threaded member.

6. The apparatus of claim 2, wherein said fastener is a pin.

7. The apparatus of claim 1, wherein said expanded structures are disposed perpendicular to a centerline of said cylindrical cavity.

8. The apparatus of claim 2, wherein said expanded structures are disposed perpendicular to a centerline of said cylindrical cavity.

9. The apparatus of claim 3, wherein said expanded structures are disposed perpendicular to a centerline of said cylindrical cavity.

10. The apparatus of claim 1, wherein said non-expanded structure includes a plurality of cutouts to lighten the weight of the elements while maintaining rigidity.

11. The apparatus of claim 2, wherein said non-expanded structure includes a plurality of cutouts to lighten the weight of the elements while maintaining rigidity.

12. The apparatus of claim 3, wherein said non-expanded structure includes a plurality of cutouts to lighten the weight of the elements while maintaining rigidity.

13. The apparatus of claim 7, wherein said non-expanded structure includes a plurality of cutouts to lighten the weight of the elements while maintaining rigidity.

14. The apparatus of claim 1, further comprising a second set of elements adapted to couple to said axle, wherein each of said elements includes a semi-circular longitudinal channel of a second pre-determined length, and said second set of elements are configured to create a substantially consistent cylindrical cavity along said second pre-determined length.

15. The apparatus of claim 2, further comprising a second set of elements adapted to couple to said axle, wherein each of said elements includes a semi-circular longitudinal channel of a second pre-determined length, and said second set of elements are configured to create a substantially consistent cylindrical cavity along said second pre-determined length.

16. An apparatus including a stiffening structure stiffening a portion of a vehicle axle for reducing deflection of said axle, wherein said axle is continuous in said apparatus comprising:

a first set of elements adapted to be coupled to said axle, wherein each of said elements includes a semi-circular longitudinal channel of a first pre-determined length;

a second set of elements adapted to be coupled to said axle, wherein each of said elements includes a semi-circular longitudinal channel of a second pre-determined length that is longer than said first predetermined length;

wherein each element includes a set of expanded structures, located generally near the ends of each element, each expanded structure having a recess configured to accept a fastener to facilitate clamping said elements around said axle;

wherein each element includes a non-expanded structure located generally between said set of expanded structures; and wherein coupling said corresponding elements to said axle are configured to reduce an amount of deflection in relative to said predetermined length.

17. The apparatus of claim 16, wherein said first set of elements is configured to create a substantially consistent cylindrical cavity along said first pre-determined length, and wherein said second set of elements is configured to create a substantially consistent cylindrical cavity along said second pre-determined length.

18. The apparatus of claim 16, wherein said non-expanded structure includes a plurality of cutouts to lighten the weight of the elements while maintaining rigidity.

19. The apparatus of claim 17, wherein said non-expanded structure includes a plurality of cutouts to lighten the weight of the elements while maintaining rigidity.

* * * * *